United States Patent Office 3,072,636

Patented Jan. 8, 1963

3,072,636

PROCESS FOR THE MANUFACTURE OF ETHYLENEIMINE DERIVATIVES

Andor Fürst, Basel, and Emilio Kyburz, Riehen, Switzerland, and Stefano Majnoni, Milan, Italy, assignors to Hoffmann-La Roche Inc., Nutley, N.J., a corporation of New Jersey No Drawing. Filed Oct. 22, 1958, Ser. No. 768,847
Claims priority, application Switzerland Oct. 25, 1957
14 Claims. (Cl. 260—239)

This invention relates to a method for the production of ethyleneimine derivatives having the general formula

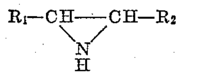

(I)

wherein $R_1$ represents hydrogen, alkyl, cycloalkyl, aryl or aralkyl, and $R_2$ represents cyano, carboxyl, carbamyl, N-hydroxycarbamyl or carbalkoxy, and salts thereof in good yield. The method comprises treating a compound having the general formula

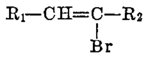

(II)

wherein $R_1$ and $R_2$ have the same significance as above, with liquid ammonia.

Typical radicals represented by $R_1$ include such alkyl groups as lower alkyl groups, e.g. methyl, ethyl, propyl, isopropyl, butyl and the like as well as higher homologous alkyl groups such as octyl, nonyl, etc.; cycloalkyl groups such as cyclopentyl and cyclohexyl; monocyclic aryl groups such as phenyl, p-nitrophenyl, etc.; and phenyl lower alkyl groups such as benzyl and the like. Preferred groups represented by $R_2$ are lower carbalkoxy groups such as carbomethoxy, carbethoxy, carbopropoxy, carbisopropoxy, carbobutoxy, etc.

Preferred starting materials are lower alkyl esters, especially the methyl, ethyl or isopropyl esters of α-bromoacrylic acid, α,β-dibromopropionic acid, α,β-dibromobutyric acid, α-bromocrotonic acid, α-bromo-α,β-nonencarboxylic acid, α-bromo-α,β-decencarboxylic acid, α-bromo-β-phenyl-acrylic acid and α-bromo-β-(p-nitrophenyl)-acrylic acid.

If the symbol $R_2$ in Formula II represents a carbomethoxy group, then the principal reaction product is the acid amide. In the case of the higher homologous esters, such as the ethyl, isopropyl or butyl esters, however, the ester group generally remains unchanged in the reaction.

In order to prevent polymerization, polymerization inhibitors such as hydroquinone, p-phenylenediamine, diphenylamine, phenyl-β-naphthylamine may be added during the reaction. The liquid ammonia used in the reaction may contain some water.

Instead of compounds having the Formula II such readily obtainable substances as α,β-dibromo compounds having the general formula

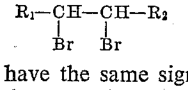

(III)

wherein $R_1$ and $R_2$ have the same significance as above, may be used as starting materials. Under the treatment with liquid ammonia, the compounds of Formula III are converted at first into the corresponding compounds of Formula II. Then, as the reaction continues, they are converted to the compounds of Formula I.

The compounds of this invention are useful as intermediates for the preparation of α-amino-β-hydroxy carboxylic acids or esters thereof, e.g. serine or serine methyl esters, α-amino-β-chloro carboxylic acids or esters thereof, e.g. isopropyl α-amino-β-chloro-propionate, and 4-amino-3-isoxazolidone as well as 5-substituted derivatives thereof. If $R_2$ in Formula I represents cyano, carboxyl carbamyl or N-hydroxy carbamyl these radicals are advantageously converted to carbalkoxy according to methods known per se. The ethyleneimine derivatives may be converted to α-amino-β-chloro carboxylic acid esters by treatment with hydrochloric acid. If the ethyleneimine compounds are treated with alkali or with diluted aqueous acids, α-amino-β-hydroxy carboxylic acid esters are formed. The α-amino-β-chloro carboxylic acid derivatives may be converted to 4-amino-3-isoxazolidone or a 5-substituted derivative thereof according to the methods disclosed in the following copending applications: Serial No. 593,031, U.S.P. 2,862,020, filed June 22, 1956, by Balthasar Hegedüs, Serial No. 597,569, U.S.P. 2,862,001, filed July 13, 1956, by Hans Kirchensteiner et al., Serial No. 620,188, U.S.P. 2,862,002, filed November 5, 1956, by Arthur Boller et al., and Serial No. 624,722, U.S.P. 2,862,003, filed November 28, 1956, by Hans Kirchensteiner et al.

The following examples are illustrative of the invention. All temperatures are expressed in degrees centigrade.

*Example 1*

28 grams of ethyl α-bromoacrylate were dropped into 500 cc. of liquid ammonia and stirred for 4 hours. The mixture was evaporated to dryness and the residue was extracted with 500 cc. of acetonitrile, the ammonium bromide formed remaining undissolved. The filtrate was evaporated and extracted with 400 cc. of absolute ether. A small amount of a resinous residue remained. The filtrate was concentrated. The residue was a red oil containing colorless 2-carbethoxyethyleneimine, B.P. 53–54°/11 mm.; $n_D^{23.5}=1.4372$; $d^{20}=1.0592$.

A solution of 1 gram of picric acid in 20 cc. of ethanol was added to a solution of 0.5 gram of 2-carbethoxy-ethyleneimine in 1 cc. of ethanol. The 2-carbethoxy-ethyleneimine picrate crystallized out of the concentrated reaction mixture; M.P. 90–91°.

4.6 grams of 2-carbethoxy-ethyleneimine were slowly added to 10 cc. of 38% hydrochloric acid at 0° and stirred for 15 minutes. The mixture was poured into 20 cc. of ethanol and evaporated to dryness at 30°. The oily residue was then repeatedly dissolved in ethanol and again dried in vacuo. The residue was now further dried in a high vacuum over sodium hydroxide, whereby the oil solidified. It consisted of 38% of isochloroserine ethyl ester hydrochloride, as determined by titration according to Cromwell, J. Am. Chem. Soc. 70 (1948), 1320, and of 62% of chloroserine ethyl ester hydrochloride.

*Example 2*

78 grams of ethyl α,β-dibromopropionate were dropped into 200–300 cc. of liquid ammonia and stirred for 2 hours. The product was worked up according to the procedure of Example 1 whereupon pure 2-carbethoxy-ethyleneimine was obtained.

*Example 3*

26 grams of ethyl α,β-dibromopropionate were dissolved in 200 cc. of liquid ammonia and stirred for 3 hours. After separating the ammonia, the residue was directly distilled in a high vacuum. The distillate containing 2-carbethoxy-ethyleneimine was condensed in a Dry Ice trap.

*Example 4*

78 grams of ethyl α,β-dibromopropionate were dissolved in one liter of liquid ammonia and stirred for 40 minutes. The mixture was then concentrated and treated with 50 cc. of water in order to completely dissolve the residue. The solution was saturated with sodium chloride and extracted four times with 400 cc. of ether. The extract was dried with sodium sulfate and the filtrate was evaporated at 20°/12 mm. There was obtained an oily residue which, after distillation, yielded 2-carbethoxy-ethyleneimine.

*Example 5*

74 grams of methyl α,β-dibromopropionate were dissolved in 1.2 liters of liquid ammonia and stirred for 40 minutes. The mixture was then concentrated and the residue extracted with 600 cc. of acetonitrile. There remained a residue which consisted primarily of ammonium bromide. The filtrate was evaporated, the residue was extracted with methylene chloride, the filtrate was again evaporated and the residue again extracted with ether. After evaporated the ether solution there remained a light fluid oil, which, after a third distillation, at 50–65°/11 mm., yielded 2-carbomethoxy-ethyleneimine, $n_D^{24}=1.4390$; $d^{20}=1.1181$.

From the residue of the ether extraction there was isolated the amide of 2-carboxy-ethyleneimine. Upon recrystallization from ethanol-ether, it melted at 116–118°.

*Example 6*

40 grams of n-butyl α,β-dibromopropionate were stirred for 4 hours in 500 cc. of liquid ammonia. After evaporation, the residue was extracted with acetonitrile and the residue, consisting of ammonia bromide, was separated by filtration. The filtrate was evaporated and extracted with ether. The ethereal solution was evaporated and the residual oil was distilled in vacuo at 83–84°/13 mm. to obtain 2-carbobutoxy-ethyleneimine, $n_D^{25}=1.4400$.

*Example 7*

82.2 grams of ethyl α,β-dibromobutyrate were stirred for half an hour in 900 cc. of liquid ammonia. After evaporation, the residue was extracted with 700 cc. of acetonitrile. The ammonium bromide residue was filtered off and the filtrate was evaporated. The residue was extracted with 500 cc. of ether. The ethereal solution was filtered and evaporated, leaving an oily residue. This yielded upon distillation at 70–75°/12 mm. 2-methyl-3-carbethoxy-ethyleneimine, $n_D^{24}=1.4404$.

*Example 8*

82 grams of isopropyl α,β-dibromopropionate were introduced dropwise within 1¼ hours into 1200 cc. of liquid ammonia which contained as stabilizer 0.8 gram of phenyl-β-naphthylamine. The mixture was further stirred for 3 hours and then the ammonia evaporated in vacuo. The solid residue was taken up in 500 cc. of ether and 200 cc. of a saturated sodium chloride solution. The ethereal phase was separated and the aqueous solution extracted with 2 portions of 500 cc. of ether. The combined ethereal extracts were dried with sodium sulfate and, after filtration, evaporated in vacuo. The oily residue yielded upon distillation at 52–53°/11 mm. 2-carbisopropoxy-ethyleneimine.

We claim:

1. A method for the production of a compound of the formula

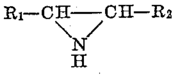

wherein $R_1$ represents a member of the group consisting of hydrogen, lower alkyl, 5 to 6 carbon cycloalkyl, monocyclic aryl and monocyclic aryl-lower alkyl, and $R_2$ represents a member of the group consisting of cyano, carboxyl, carbamyl, N-hydroxycarbamyl and lower carbalkoxy, which comprises reacting a compound of the formula

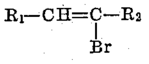

wherein $R_1$ and $R_2$ have the same significance as above, with liquid ammonia.

2. A method for the production of an acid addition salt of a compound of the formula

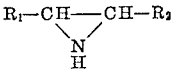

wherein $R_1$ represents a member of the group consisting of hydrogen, lower alkyl, 5 to 6 carbon cycloalkyl, monocyclic aryl and monocyclic aryl-lower alkyl, and $R_2$ represents a member of the group consisting of cyano, carboxyl, carbamyl, N-hydroxycarbamyl and lower carbalkoxy, which comprises reacting a compound of the formula

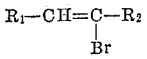

wherein $R_1$ and $R_2$ have the same significance as above, with liquid ammonia and reacting the product with acid to form the acid addition salt.

3. A method for the production of a compound of the formula

wherein $R_1$ represents a member of the group consisting of hydrogen, lower alkyl, 5 to 6 carbon cycloalkyl, monocyclic aryl and monocyclic aryl-lower alkyl, and $R_2$ represents a member of the group consisting of cyano, carboxyl, carbamyl, N-hydroxycarbamyl and lower carbalkoxy, which comprises reacting a compound of the formula

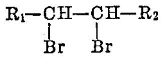

wherein $R_1$ and $R_2$ have the same significance as above, with liquid ammonia.

4. A method for the production of an acid addition salt of a compound of the formula

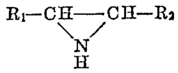

wherein $R_1$ represents a member of the group consisting of hydrogen, lower alkyl, 5 to 6 carbon cycloalkyl, monocyclic aryl and monocyclic aryl-lower alkyl, and $R_2$ represents a member of the group consisting of cyano, carboxyl, carbamyl, N-hydroxycarbamyl and lower carbalkoxy, which comprises reacting a compound of the formula

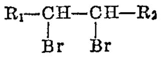

wherein $R_1$ and $R_2$ have the same significance as above, with liquid ammonia and reacting the product with acid to form the acid addition salt.

5. A process which comprises reacting lower alkyl α-bromoacrylate with liquid ammonia.

6. A process which comprises reacting ethyl α-bromoacrylate with liquid ammonia.

7. A process which comprises reacting isopropyl α-bromoacrylate with liquid ammonia.

8. A process which comprises reacting lower alkyl α,β-dibromopropionate with liquid ammonia.

9. A process which comprises reacting ethyl α,β-dibromopropionate with liquid ammonia.

10. A process which comprises reacting methyl α,β-dibromopropionate with liquid ammonia.

11. A process which comprises reacting isopropyl α,β-dibromopropionate with liquid ammonia.

12. A process which comprises reacting lower alkyl α,β-dibromobutyrate with liquid ammonia.

13. A process which comprises reacting ethyl α,β-dibromobutyrate with liquid ammonia.

14. A process which comprises reacting isopropyl α,β-dibromobutyrate with liquid ammonia.

(References on following page)

References Cited in the file of this patent

UNITED STATES PATENTS 2,892,871 Filbez et al. ____________ June 30, 1959

OTHER REFERENCES

Degering: Organic Nitrogen Compounds, page 200 (1945).

Cromwell et al.: J. Am. Chem. Soc., vol. 71, pages 708–11 (1948).

Honig et al.: Van Nostrand Chemist's Dictionary, 1953, p. 29.

Prostenik et al.: J. Am. Chem. Soc., vol. 77, pp. 1856–59 (1955).